US010382644B2

(12) United States Patent
Yoshida

(10) Patent No.: US 10,382,644 B2
(45) Date of Patent: Aug. 13, 2019

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Toru Yoshida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/766,311

(22) Filed: Feb. 13, 2013

(65) Prior Publication Data

US 2013/0155440 A1 Jun. 20, 2013

Related U.S. Application Data

(63) Continuation of application No. 13/233,168, filed on Sep. 15, 2011, now Pat. No. 8,402,009.

(30) Foreign Application Priority Data

Sep. 22, 2010 (JP) ................................ 2010-212381

(51) Int. Cl.
*G06F 16/00* (2019.01)
*H04N 1/00* (2006.01)
(Continued)

(52) U.S. Cl.
CPC ....... *H04N 1/2179* (2013.01); *H04N 1/00214* (2013.01); *H04N 1/00217* (2013.01);
(Continued)

(58) Field of Classification Search
CPC ......... G06F 17/30946; G06F 17/30067; G06F 17/3091; G06F 16/183; H04N 2201/0094;
(Continued)

(56) References Cited

U.S. PATENT DOCUMENTS 5,893,114 A 4/1999 Hashimoto
5,935,260 A 8/1999 Ofer
(Continued)

FOREIGN PATENT DOCUMENTS

CN 1481635 A 3/2004
CN 101729725 A 6/2010
(Continued)

OTHER PUBLICATIONS

Extended European Search Report dated Mar. 21, 2013 for corres. EP 11182111.2.
(Continued)

*Primary Examiner* — Merilyn P Nguyen
(74) *Attorney, Agent, or Firm* — Rossi, Kimms & McDowell LLP

(57) ABSTRACT

An information processing apparatus that positively notifies a notification destination of information to be notified even if a communication protocol is changed before notifying storage of stored data. A notification setting processing section of a document storage notification application sets a protocol for accessing the stored document data from a computer via a network. When document data is stored in a HDD, a mail transmission processing section notifies the computer of storage location information on the document data for accessing the data according to the set protocol. If the set protocol is changed before the storage location information is notified to the computer, a control section causes the mail transmission processing section to notify the computer of storage location information for causing the document data to be accessed using the changed protocol.

16 Claims, 15 Drawing Sheets

(51) Int. Cl.
*H04N 1/21* (2006.01)
*H04N 1/333* (2006.01)
*G06F 16/182* (2019.01)

(52) U.S. Cl.
CPC ....... *H04N 1/33346* (2013.01); *G06F 16/183* (2019.01); *H04N 2201/0012* (2013.01); *H04N 2201/0018* (2013.01); *H04N 2201/0039* (2013.01); *H04N 2201/0094* (2013.01); *H04N 2201/3218* (2013.01); *H04N 2201/3249* (2013.01); *H04N 2201/3278* (2013.01)

(58) Field of Classification Search
CPC ....... H04N 2201/0012; H04N 1/00217; H04N 1/00474; H04L 67/02; H04L 67/06
USPC .................................................. 707/705, 812
See application file for complete search history.

(56) References Cited

U.S. PATENT DOCUMENTS

| | | | | |
|---|---|---|---|---|
| 6,334,080 | B1 | 12/2001 | Iwai et al. | |
| 6,738,784 | B1 * | 5/2004 | Howes | |
| 6,982,811 | B2 * | 1/2006 | Sato | H04N 1/00917 358/1.15 |
| 7,194,543 | B2 | 3/2007 | Robertson et al. | |
| 7,734,631 | B2 * | 6/2010 | Richardson et al. | 707/749 |
| 7,822,781 | B2 | 10/2010 | Greene et al. | |
| 8,112,446 | B2 | 2/2012 | Carman | |
| 8,176,210 | B2 | 5/2012 | Tang et al. | |
| 8,325,366 | B2 * | 12/2012 | Yamaguchi | H04N 1/00 358/1.15 |
| 8,612,521 | B2 | 12/2013 | Tonegawa | |
| 8,654,036 | B2 * | 2/2014 | Takahashi | G06F 3/1423 345/2.1 |
| 8,773,695 | B2 * | 7/2014 | Matoba | H04L 61/1594 358/1.13 |
| 8,826,012 | B2 * | 9/2014 | Kuroyanagi | H04L 63/0428 380/243 |
| 2002/0083118 | A1 | 6/2002 | Sim | |
| 2005/0030939 | A1 * | 2/2005 | Roy | H04L 12/2856 370/352 |
| 2005/0038897 | A1 * | 2/2005 | Clarke | H04L 69/08 709/230 |
| 2005/0273699 | A1 | 12/2005 | Oi | |
| 2006/0075036 | A1 | 4/2006 | Malik | |
| 2006/0271540 | A1 * | 11/2006 | Williams | 707/7 |
| 2006/0271697 | A1 | 11/2006 | Kruse et al. | |
| 2007/0130143 | A1 * | 6/2007 | Zhang et al. | 707/8 |
| 2007/0159652 | A1 * | 7/2007 | Sato | H04N 1/00222 358/1.15 |
| 2007/0185974 | A1 * | 8/2007 | Kawasaki | 709/217 |
| 2008/0091768 | A1 * | 4/2008 | Tanimoto | H04L 67/06 709/202 |
| 2009/0083439 | A1 * | 3/2009 | Matsuda | H04L 61/1523 709/245 |
| 2009/0113010 | A1 * | 4/2009 | Kobayashi | H04N 1/333 709/206 |
| 2009/0198719 | A1 * | 8/2009 | DeWitt | 707/102 |
| 2009/0199214 | A1 * | 8/2009 | Asahara | G06F 9/4443 719/320 |
| 2009/0238364 | A1 * | 9/2009 | Furukawa | H04N 1/00222 380/243 |
| 2010/0073730 | A1 * | 3/2010 | Park | H04N 1/0084 358/402 |
| 2010/0103450 | A1 | 4/2010 | Yanazume | |
| 2010/0106698 | A1 * | 4/2010 | Nakayama | G06F 17/30073 707/705 |
| 2010/0235605 | A1 | 9/2010 | Perry et al. | |
| 2011/0149343 | A1 * | 6/2011 | Matoba | G06F 3/1267 358/1.15 |

FOREIGN PATENT DOCUMENTS

| | | | |
|---|---|---|---|
| JP | 2002-207636 | A | 7/2002 |
| JP | 2006048168 | A | 2/2006 |
| JP | 2007080200 | A | 3/2007 |
| JP | 2008-027065 | A | 2/2008 |
| JP | 2008-130089 | A | 6/2008 |

OTHER PUBLICATIONS

Office Action issued in counterpart Chinese Patent Application No. 201110282966.5 dated Dec. 23, 2014.

Japanese Office Action issued in counterpart application No. JP2015025250, dated Dec. 8, 2015.

Japanese Office Action issued in Counterpart Application No. 2010-212381, dated Apr. 22, 2014.

* cited by examiner

*FIG.6*

| ID | PATH INFORMATION | DOCUMENT ID INFOR-MATION | NOTIFI-CATION TIMING | NOTIFYING DESTINATION | TITLE | BODY |
|---|---|---|---|---|---|---|
| 1 | http://192.168.100.11 /share/folder | 012345678 | SCAN | abcdef@ xxx.yyy.zz | NEW DOCUMENT HAS BEEN STORED | NEW DOCUMENT HAS BEEN STORED IN THE FOLLOWING LOCATION. PLEASE CONFIRM. |
| 2 | http://192.168.100.11 /share/fax | 123456789 | TRANSFER | ghiijkl@ xxx.yyy.zz | FAX HAS BEEN RECEIVED | THE FOLLOWING FAX MESSAGE HAS BEEN RECEIVED. PLEASE CONFIRM. |
| | | | | | | |

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, and more particularly to an information processing apparatus that sends a storage notification when digital data is stored in a storage device thereof, a method of controlling the information processing apparatus, and a storage medium.

Description of the Related Art

In general, there has been known an image processing apparatus, such as a digital multifunction peripheral (MFP), as an example of an information processing apparatus. The following description will be given of the MFP as an example of the information processing apparatus.

The MFP is equipped with not only a copy function and a print function but also a storage function that stores digital data (document data, etc.) as stored data, a sharing function that shares the stored data with other apparatuses, and so forth.

Further, recently, to share stored data, there has been proposed an MFP equipped with a server function so as to disclose and share the stored data using a protocol, such as the SMB protocol or the WebDAV protocol.

Further, some MFPs are equipped with an information notifying function that sends information (e.g. a function of notifying an external apparatus that new document data has been stored in the MFP), and using the information notifying function, transmit the stored data by attaching the same to an e-mail. Further, some MFPs also notify access information (e.g. URI (Uniform Resource Identifier) information) for accessing the stored data using the information notifying function.

For example, an MFP performs document storing processing for storing document data obtained by scanning an original in a storage area, i.e. a so-called box. Then, upon confirming that document data has been newly stored in the box, the MFP sends a document storage notification indicating that the document data has been stored in the box, by e-mail or the like, to a notifying destination registered in advance. Access information (URI information) for enabling access to the document data is attached to this document storage notification.

For this notification of storage of stored data, Japanese Patent Laid-Open Publication No. 2008-27065 discloses a technique of notifying a user of only information necessary to the user, in response to a request of the user. That is, in this technique, the notification of storage of stored data is performed depending on various conditions.

The present invention is focused on the following problem concerning contents of notification disclosed in Japanese Patent Laid-Open Publication No. 2008-27065:

In Japanese Patent Laid-Open Publication No. 2008-27065, although the notifying destination and the notification conditions for notifying storage of stored data can be changed, information to be notified (i.e. URI information, referred to hereinafter) is set in advance.

For example, let it be assumed that when stored data can be accessed using e.g. the HTTP protocol, the storage notification is configured such that the URI information is notified according to the HTTP protocol. In this case, if a port number for the HTTP protocol is changed, since the URI information as the information to be notified has been set in advance, even when the URI information is notified, the stored data cannot be accessed.

In addition, there is sometimes a time lag after the URI information to be notified is determined until the notification processing is performed. In this case, between the determination of the URI information to be notified and execution of the notification processing, if a change of e.g. a folder name indicative of a storage location of the stored data is made, even when the URI information is notified, the stored data cannot be accessed.

SUMMARY OF THE INVENTION

The present invention provides an information processing apparatus that positively notifies a notification destination of information to be notified even if a communication protocol is changed before notifying storage of stored data or the like, thereby making it possible to access the stored data from the notifying destination, a method of controlling the information processing apparatus, and a storage medium.

In a first aspect of the present invention, there is provided an information processing apparatus that communicates with an external apparatus via a network, comprising a storage unit configured to store a digital document, a setting unit configured to set a communication protocol for accessing the stored digital document from the external apparatus via the network, a notification unit configured to be operable when a new digital document is stored in the storage unit, to notify the external apparatus of storage location information on the new digital document for accessing the new digital document according to the set communication protocol, and a control unit configured to be operable when the setting of the communication protocol set by the setting unit is changed after the new digital document has been stored in the storage unit and at least before the notification unit notifies the external apparatus of the storage location information, to cause the notification unit to notify the external apparatus of storage location information for accessing the new digital document according to the changed communication protocol.

In a second aspect of the present invention, there is provided a method of controlling an information processing apparatus that communicates with an external apparatus via a network, comprising storing a digital document in a storage unit, setting a communication protocol for accessing the stored digital document from the external apparatus via the network, notifying, when a new digital document is stored in the storage unit, the external apparatus of storage location information on the new digital document for accessing the new digital document according to the set communication protocol, and causing, when the setting of the communication protocol set by the setting is changed after the setting sets the communication protocol and at least before the notifying notifies the external apparatus of the storage location information, the notifying to notify the external apparatus of storage location information for accessing the new digital document according to the changed communication protocol.

In a third aspect of the present invention, there is provided a non-transitory computer-readable storage medium storing a computer-executable program for causing an information processing apparatus to execute the control method.

According to the present invention, even if the communication protocol for notifying storage of stored data is changed after setting the communication protocol and before execution of the data storage notification, it is possible to notify a notifying destination of correct access information.

As a result, the present invention provides an advantageous effect that it is possible to positively access the stored data from the notifying destination.

Further features of the present invention will become apparent from the following description of exemplary embodiments with reference to the attached drawings.

BRIEF DESCRIPTION OF THE DRAWINGS

FIG. 6 illustrates an example of notification setting information registered by an information management section appearing in FIG. 3.

DESCRIPTION OF THE EMBODIMENTS

The present invention will now be described in detail below with reference to the accompanying drawings showing embodiments thereof.

Although a description will be given here of an image processing apparatus as an example of an information processing apparatus, by way of example, the present invention can be similarly applied to any apparatus other than the image processing apparatus insofar as the apparatus performs information processing, stores processed data as stored data, and performs storage notification for notifying storage of the stored data.

Figure 1:
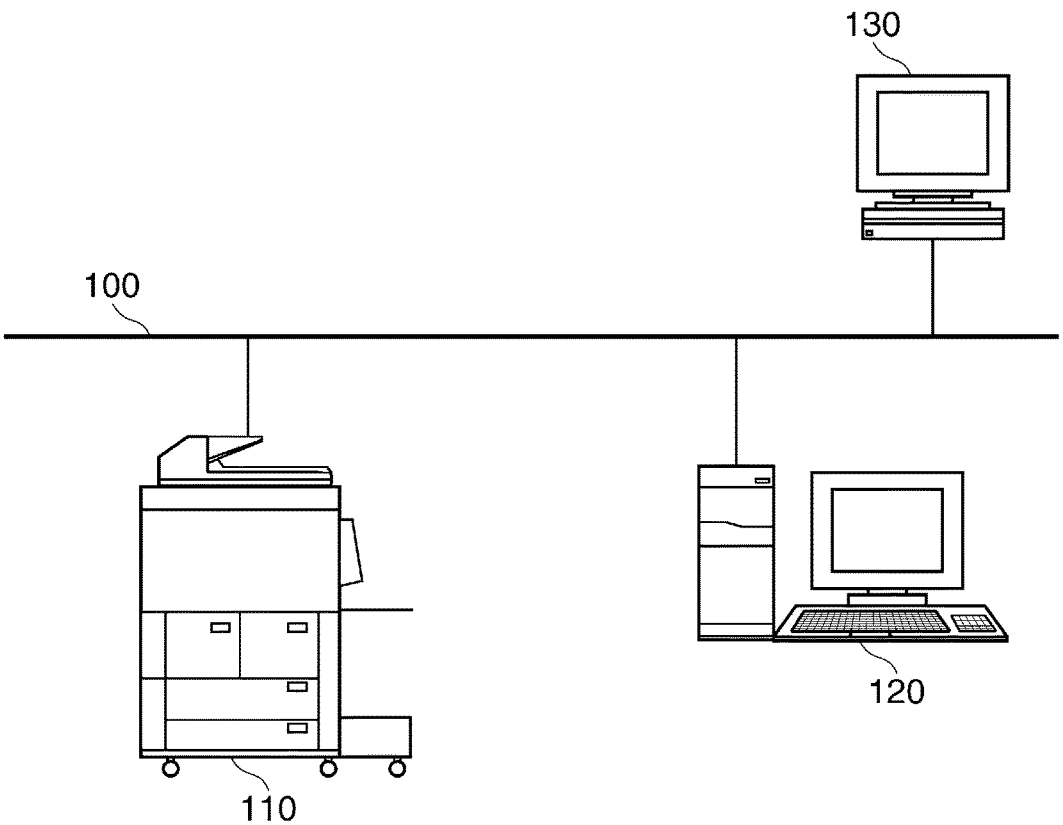
FIG. 1 illustrates an example of an image processing system including an MFP as an information processing apparatus according to a first embodiment of the present invention.

FIG. 1 illustrates an example of an image processing system including the image processing apparatus as the information processing apparatus according to a first embodiment of the present invention.

The illustrated image processing system comprises a digital multifunction peripheral (hereinafter referred to as the "MFP") 110 as the image processing apparatus, a mail server 120, and a computer 130. The MFP 110, the mail server 120, and the computer 130 are interconnected via a network 100. Note that although in the illustrated example, only one MFP 110 is shown, a plurality of MFPs 110 may be connected to the network 100. Further, the image processing system may also include a plurality of computers 130.

The illustrated MFP 110 is e.g. an apparatus equipped with a plurality of functions such as a scan function, a facsimile function, an e-mail transmission function, and a Web server function. In the illustrated example, the MFP 110 performs data storage processing and data storage notification, described hereinafter, using these functions.

In the data storage processing (hereinafter also referred to as the document storage processing), digital data obtained by reading an original by a scanner (hereinafter referred to as the document data), or document data received from an external apparatus via a network or a public communication line is stored e.g. in a predetermined storage area (box) of a hard disk drive (HDD), as stored data. In the data storage notification (hereinafter also referred to as the document storage notification), the MFP 110 notifies information indicating that the document data has been stored by the document storage processing to a destination set in advance (notifying destination) e.g. by e-mail.

In the MFP 110, as described hereinafter, a document storage notification application operates for performing document storage notification, whereby the MFP 110 sets forth access information concerning the document data stored in the predetermined storage area of the HDD in an e-mail, and transmits the e-mail to the mail server 120. The access information is e.g. URI (Uniform Resource Identifier) information for enabling access to the document data.

The mail server 120 is an SMTP server and a POP3 server, and receives the information transmitted by the MFP 110 and the like via the network 100. Further, the mail server 120 can transmit the received information via the network 100.

The computer 130 performs transmitting and receiving e-mails using the mail server 120. Further, a Web browser is installed in the computer 130, which enables the computer 130 to directly access the MFP 110 via the network 100.

A user receives an e-mail from the mail server 120 by the computer 130. Then, by accessing the MFP 110 using the access information described in the e-mail, the user can use the document data stored in the MFP 110.

By the way, even when the document data is stored in the storage area, the document storage notification application which operates on the MFP 110 does not immediately transmit the e-mail (i.e. does not immediately perform storage notification). When a plurality of items of document data are stored, the document storage notification application performs document storage notification collectively for the stored items of document data by e-mail. This reduces the number of e-mails to be transmitted.

For example, the document storage notification application sends an e-mail when 30 seconds elapse after the document data is stored. Further, the document storage notification application may send an e-mail whenever 60 seconds elapse. In any case, the document storage notification application executes document storage notification collectively for document data stored within a predetermined time period, by e-mail.

Figure 2:
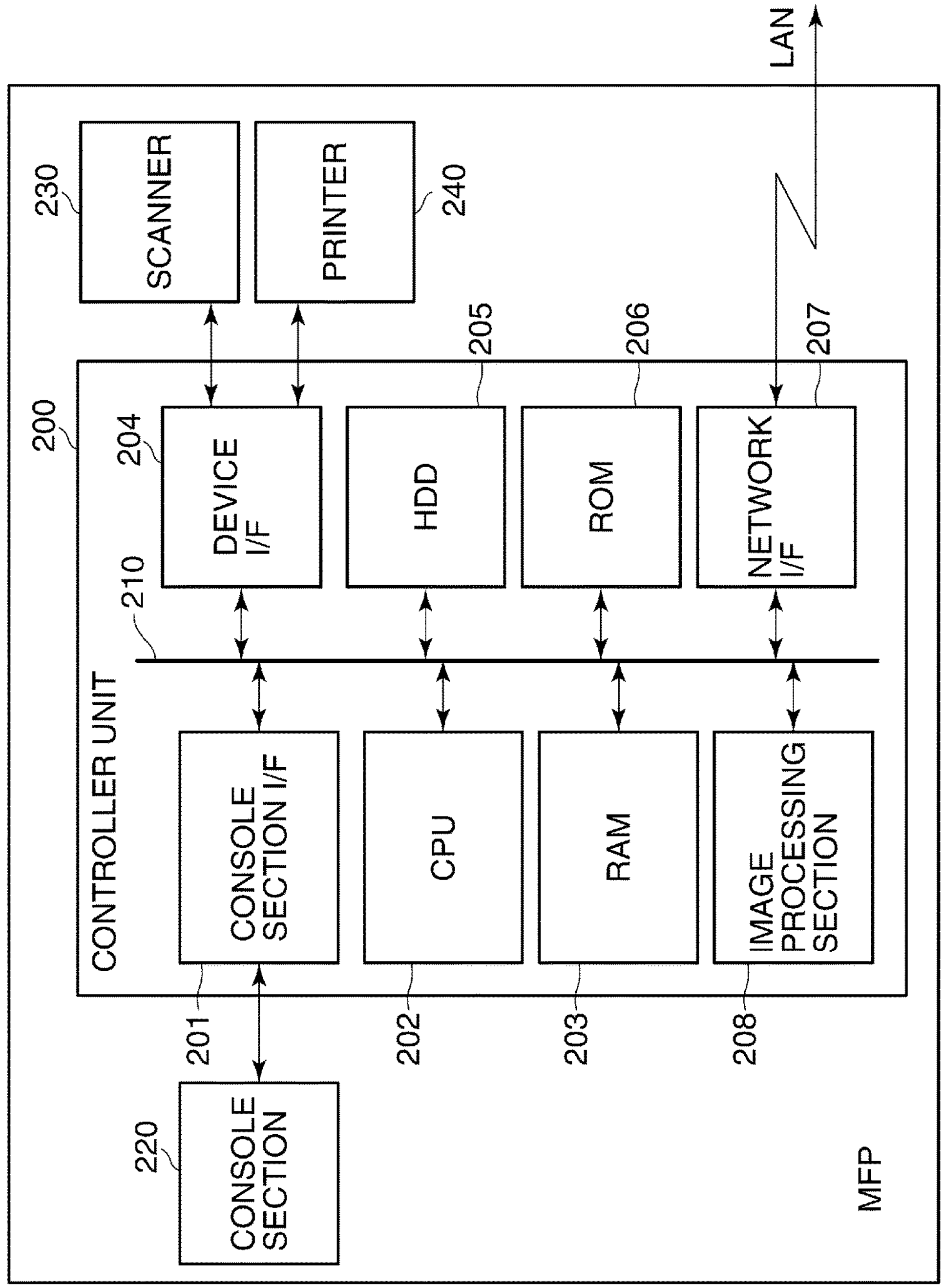
FIG. 2 is a block diagram of the hardware configuration of the MFP appearing in FIG. 1.

FIG. 2 is a block diagram of the hardware configuration of the MFP 110 appearing in FIG. 1.

Referring to FIG. 2, the MFP 110 includes a controller unit 200, a console section 220, a scanner 230, and a printer 240. The console section 220, the scanner 230 as an image input device, and the printer 240 as an image output device are connected to the controller unit 200.

The controller unit 200 comprises a console section interface (I/F) 201, a CPU 202, a RAM 203, a device interface 204, the HDD (hard disk drive), denoted by reference numeral 205, a ROM 206, a network interface 207, and an image processing section 208. Further, these component elements are interconnected by a system bus 210.

The CPU 202 starts up an operating system (OS) by a boot program stored in the ROM 206. The CPU 202 executes application programs stored in the HDD 205 on the OS to thereby perform various kinds of processing.

The RAM 203 is used as a work area for the CPU 202. Further, the RAM 203 provides a memory area for temporarily storing document data (including image data). The HDD 205 stores the application programs and document data.

The console section interface 201 provides interface for communication with the console section 220 having a touch panel, and outputs an image to be displayed to the console section 220. Further, the console section interface 201 transfers information (commands, etc.) input by the user via the console section 220 to the CPU 202.

The scanner 230 and the printer 240 are connected to the device interface 204. The device interface 204 performs synchronous-to-asynchronous or asynchronous-to-synchronous conversion of image data. The network interface 207 is connected to a LAN (local area network), and performs inputting and outputting of various kinds of information to and from the apparatuses on the LAN via the LAN.

The image processing section 208 performs input image processing on image data input from the scanner 230, and performs output image processing, image rotation, image compression, resolution conversion, color space conversion, gradation conversion, etc. on image data when outputting the image data to the printer 240.

Note that above-mentioned document storage notification application is stored in the HDD 205, and is executed by the CPU 202.

Figure 3:
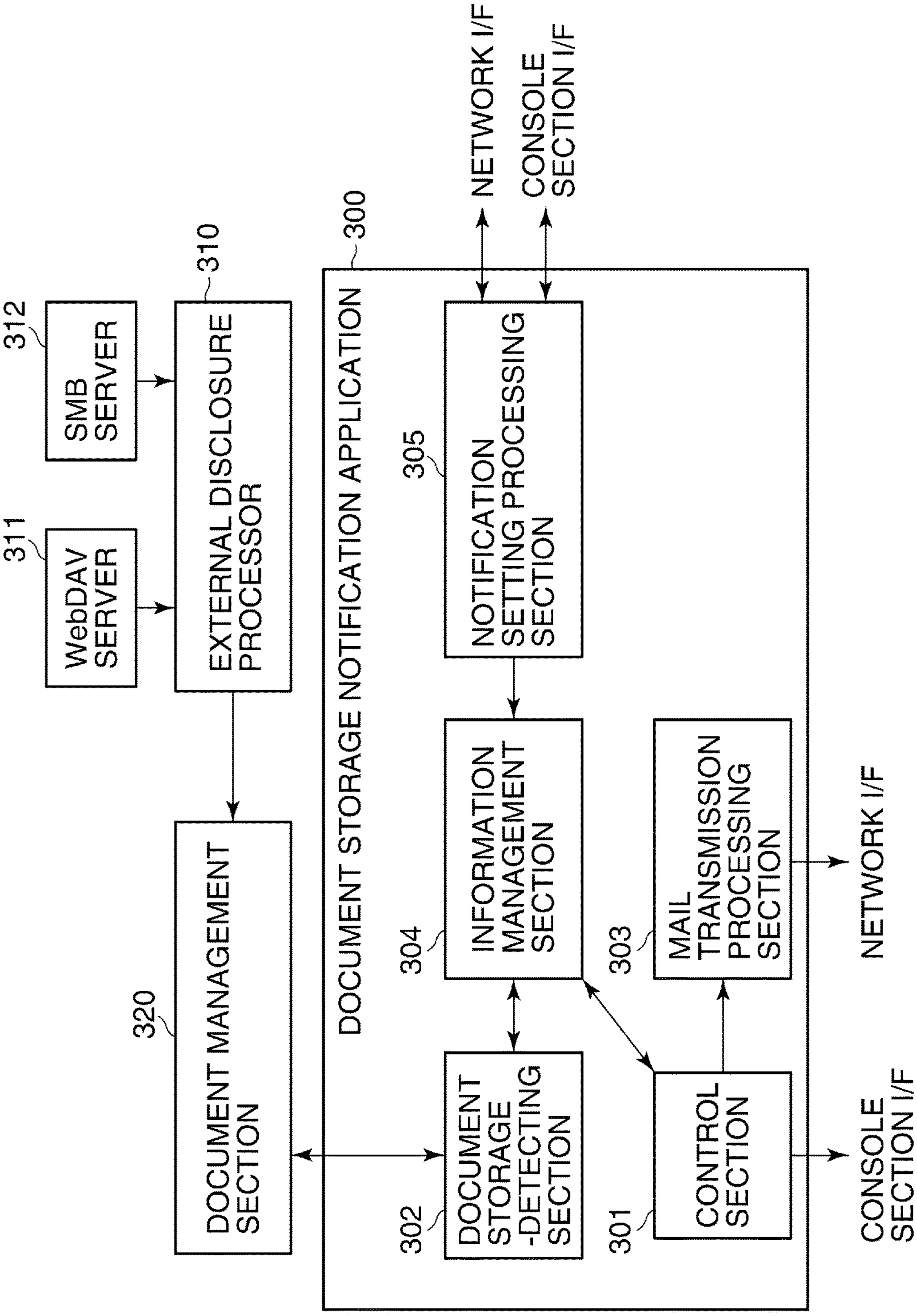
FIG. 3 is a block diagram useful in explaining functions of a document storage notification application executed by a CPU appearing in FIG. 2.

FIG. 3 is a block diagram useful in explaining functions of the document storage notification application executed by the CPU 202 appearing in FIG. 2.

Referring to FIG. 3, the document storage notification application denoted by reference numeral 300 includes a control section 301, a document storage-detecting section 302, a mail transmission processing section 303, an information management section 304, and a notification setting processing section 305. The document storage notification application 300 is loaded from the HDD 205 into the RAM 203 and executed by the CPU 202. Note that at this time, the CPU 202 loads other applications stored in the HDD 205 into the RAM 203 and execute the same, and as shown in FIG. 3, the other applications include a document management section 320 and an external disclosure processor 310.

The document management section 320 manages document data in the MFP 110. The document management section 320 stores e.g. document data obtained by reading an original by the scanner 230 and document data received from the outside via the network or the public communication line, in the predetermined storage area of the HDD 205.

When document data is stored in the HDD 205, the document management section 320 notifies the document storage notification application 300 of storage information (data storage information: also referred to as the document storage information) indicating that the document data has been stored. The storage information includes e.g. a document name, a storage location (folder name), and a creator, a creation method (e.g. scan, transfer or the like), and a creation date and time of the document data.

The external disclosure processor 310 performs access processing control of document data managed by the document management section 320 in response to an access from the computer 130 or the like. For example, a request (access) from the network 100 is received by a server module, such as a WebDAV (Web Distributed Authoring and Versioning) server 311 or a SMB (Server Message Block) server 312.

The WebDAV server 311 and the SMB server 312 send a reading/writing request for reading or writing document data to the external disclosure processor 310 in response to the received request. The external disclosure processor 310 executes reading or writing of document data to and from the document management section 320 in response to the reading/writing request. Note that the functions associated with the server modules are executed by programs operating on the CPU 202.

Next, a description will be given of the outline of processing executed by the document storage notification application 300 shown in FIG. 3.

In the document storage notification application 300, upon receipt of the storage information from the document management section 320, the document storage-detecting section 302 transfers the storage information to the information management section 304. Then, the information management section 304 store the storage information e.g. in a predetermined storage area of the HDD 205, for management thereof.

The control section 301 acquires mail information to be provided in an e-mail (i.e. storage information) from the information management section 304 whenever a time period set in advance elapses, and sends an e-mail transmission instruction to the mail transmission processing section 303, as described hereinafter. Upon receipt of the e-mail transmission instruction, the mail transmission processing section 303 generates e-mail data according to the mail information, and transmits the generated e-mail data as an e-mail to the mail server 120 via the network interface 207.

Note that information required to generate e-mail data, such as an e-mail address (notifying destination), information related to the SMTP server, etc. are stored e.g. in the HDD 205.

The notification setting processing section 305 receives a configuration request for registration, change, deletion, or list acquisition of notification settings concerning the document storage notification from the computer 130 e.g. via the network interface 207. Then, the notification setting processing section 305 notifies the information management section 304 of the notification settings. By this notification, the information management section 304 registers information on the notification settings (notification setting information) in a predetermined storage area of the HDD 205.

Then, the document storage notification application 300 performs notification by e-mail as described above, according to the storage information (mail information) on the document data which matches notification settings registered in the HDD 205.

Figure 4:
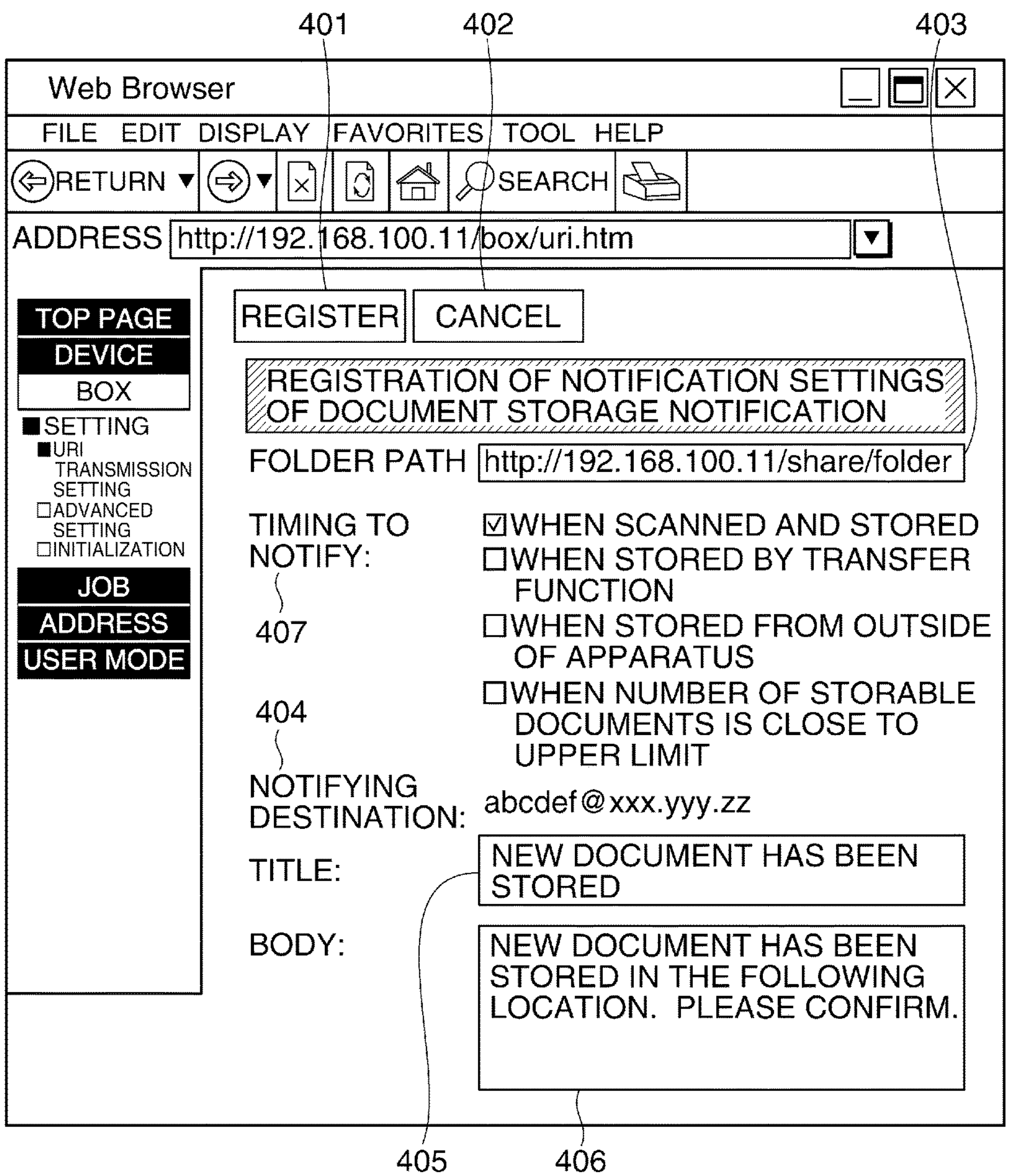
FIG. 4 illustrates an example of a notification setting registration screen for use in notification setting registration performed for the document storage notification described with reference to FIG. 3.

FIG. 4 illustrates an example of a notification setting registration screen used when performing the notification setting registration of document storage notification, described with reference to FIG. 3.

The notification setting registration screen illustrated in FIG. 4 is displayed on the computer 130 e.g. when a server module (WebDAV server 311 or SMB server 312) of the MFP 110 is accessed from the Web browser on the computer 130 via the network 100.

Note that the notification settings concerning the document storage notification may be configured from the console section 220 appearing in FIG. 2, and at this time as well, the same screen as the registration screen shown in FIG. 4 is displayed on the screen of the console section 220.

On the illustrated notification setting registration screen, a folder path 403, a notifying destination 404, an e-mail title (title) 405, an e-mail body (body) 406, and a notification timing 407 are displayed as setting items. The folder path 403 is for identifying a folder for which the document storage notification operation is to be performed. The notifying destination 404 is a destination to which an e-mail is to be sent. Further, the notification timing 407 is used for setting what kind of operation (i.e. acquisition/creation of document data) is to be performed to perform notification by e-mail (e-mail notification).

Further, on the notification setting registration screen, there are displayed a registration button 401 for registering settings input to setting items and a cancel button 402 for canceling the settings input to the setting items. When the registration button 401 is depressed in a state where the settings have been input to the setting items, the notification setting processing section 305 appearing in FIG. 3 notifies the information management section 304 of the notification settings as described above, and the information management section 304 registers the notification setting information on the notification settings in the predetermined storage area of the HDD 205.

In the example illustrated in FIG. 4, there are shown settings used when document data stored in the MFP 110 is disclosed to the computer 130 via the WebDAV server 311. In the illustrated example, the notification settings are configured such that when document data obtained by reading an original by the scanner 230 is stored in a folder indicated by "http://192.168.100.11/share/folder" in the MFP 110, which operation is defined as notification timing, an e-mail is transmitted to an e-mail address (notifying destination) indicated by "abcdef@xxx.yyy.zz".

This enables the computer 130 to access the document data stored in the MFP 110 using the URI information indicated by "http://192.168.100.11c/share/folder/documentA.pdf".

Figure 5:
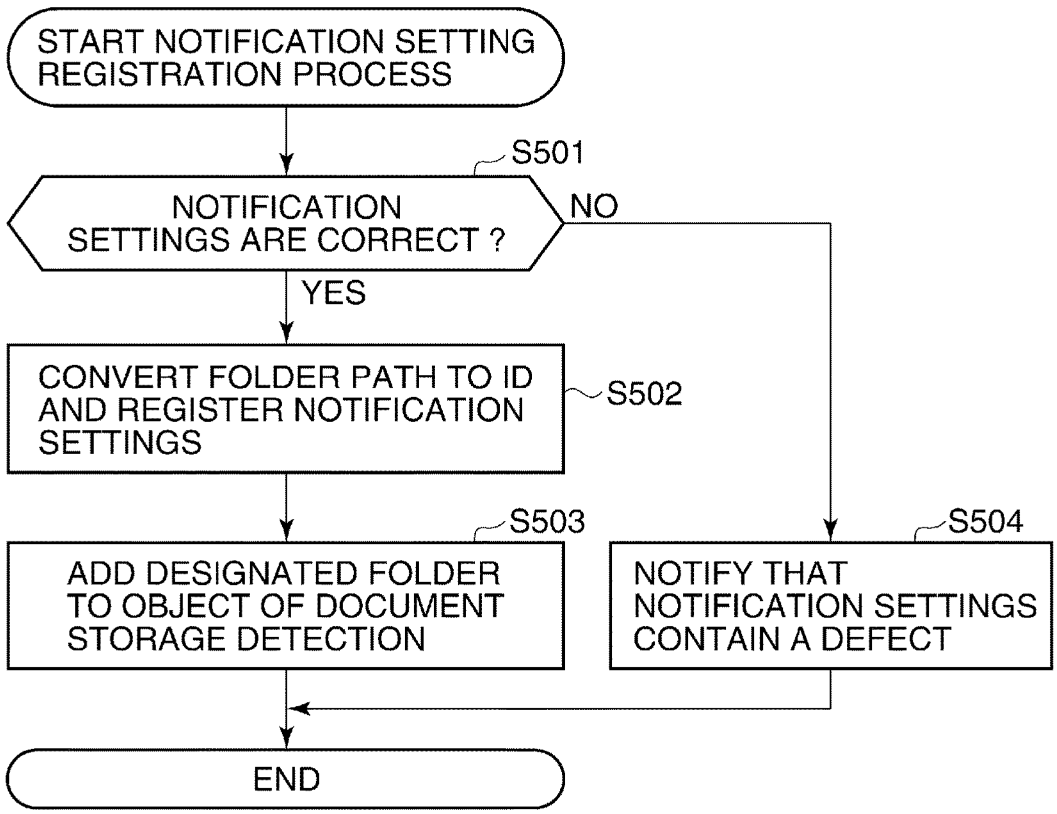
FIG. 5 is a flowchart of a notification setting registration process executed by the document storage notification application shown in FIG. 3.

FIG. 5 is a flowchart of a notification setting registration process executed by the document storage notification application 300 shown in FIG. 3. Note that as mentioned above, the document storage notification application 300 is executed by the CPU 202.

Referring to FIGS. 3 to 5, when the registration button 401 is depressed on the notification setting registration screen shown in FIG. 4, a registration request is sent to the notification setting processing section 305. Upon receipt of the registration request, the notification setting processing section 305 checks whether or not the notification settings indicated by the registration request are correct (step S501).

In this step, it is checked whether or not the folder path 403 is a URI which can be accessed from the outside, whether or not the notification timing 407 is designated, whether or not the notifying destination 404 is a correct address, and whether or not the title 405 and the body 406 include an invalid character.

If the notification settings are correct (YES to the step S501), the notification setting processing section 305 transfers the notification settings to the information management section 304. Then, the information management section 304 stores the notification settings in the HDD 205 as the notification setting information.

At this time, the information management section 304 converts the folder path 403 to document ID information, and registers the notification settings as the notification setting information (step S502). Note that the document ID information is information for uniquely identifying the document data and the folder managed by the document management section 320.

Then, to enable the document storage-detecting section 302 to receive storage information on document data from the document management section 320, the information management section 304 registers a storage information notification event for the folder indicated by the document ID information, in the document management section 320 via the document storage-detecting section 302 (step S503). That is, the information management section 304 adds the folder designated by the notification settings as an object of document storage notification. Then, the notification setting registration process is terminated.

On the other hand, if any of the notification settings is not correct (NO to the step S501), the notification setting processing section 305 notifies the computer 130 that there is a defective notification setting via the network interface (step S504), followed by terminating the notification setting registration process.

FIG. 6 illustrates an example of notification setting information registered by the information management section 304 appearing in FIG. 3.

As shown in FIG. 6, the notification setting information has an ID (ID information) sequentially assigned to each of items thereof, for distinguishing between the items of the notification setting information. Then, the path information (folder path information, i.e. storage location information) indicative of a folder path, the document ID information (data ID information; included in the storage location information), the notification timing, the notifying destination (destination information), the title, and the body of the e-mail are registered in association with the ID information.

Here, a description will be given of a process executed when document data obtained by scanning an original in the MFP 110 is stored in the storage area (folder) after the above-described notification setting registration is performed.

Figure 7:
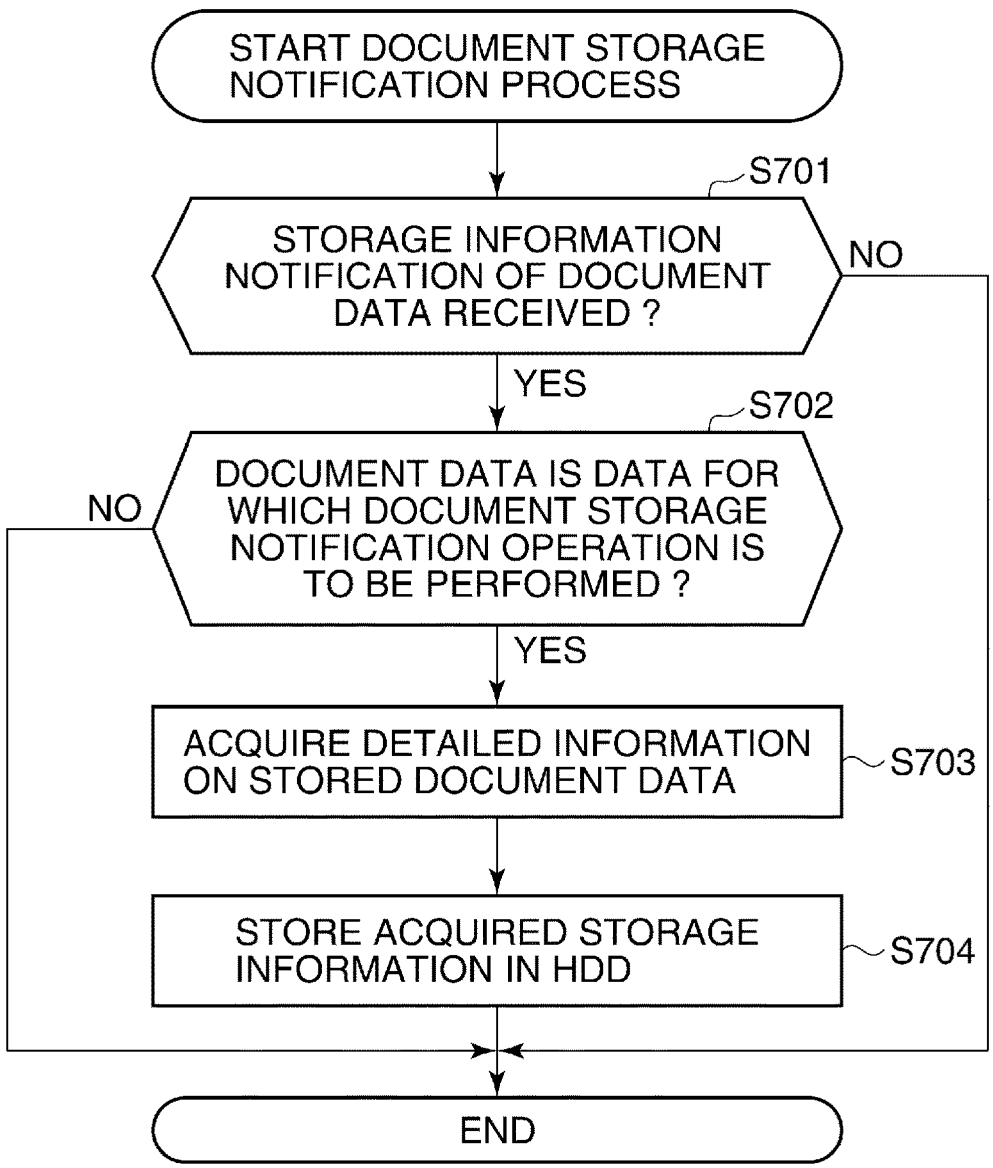
FIG. 7 is a flowchart of a document storage notification process executed by the document storage notification application shown in FIG. 3.

FIG. 7 is a flowchart of a document storage notification process executed by the document storage notification application 300 shown in FIG. 3. Note that as mentioned above, the document storage notification application 300 is executed by the CPU 202.

Referring to FIGS. 3 and 7, as described above, when document data is stored in the predetermined storage area of the HDD 205 in the MFP 110, the document management section 320 sends a storage information notification indicating the document data to the document storage-detecting section 302. The document storage-detecting section 302 is monitoring whether or not the storage information notification indicating the document data is received from the document management section 320 (step S701). As mentioned above, the storage information notification includes the document name (ID), the storage location (folder name), and the creator, the creating method (corresponding to notification timing), and the created date and time of the document data.

If the document storage-detecting section 302 receives the storage information notification from the document management section 320 (YES to the step S701), the document storage-detecting section 302 checks the storage location etc. of the document data by referring to the notification setting information (step S702). More specifically, the document storage-detecting section 302 checks whether or not the folder in which the document data is stored is a folder registered by the above-mentioned notification settings. At this time, the document storage-detecting section 302 also checks whether or not the timing of sending the storage information notification matches the notification timing registered by the notification setting information. That is, the document storage-detecting section 302 checks whether or not the document data is document data for which the document storage notification is to be performed.

If the document data indicated by the storage information notification is document data for which the document storage notification is to be performed (YES to the step S702), the document storage-detecting section 302 acquires, as detailed information, the document name of the document data and the ID information in the notification settings stored in the HDD 205 from the storage information notification (step S703). Then, the document storage-detecting section 302 passes the detailed information to the information management section 304. The information management section 304 stores the detailed information in the HDD 205 as the storage information on the document data (step S704), followed by terminating the document storage notification process.

If the storage information notification is not received in the step S701 (NO to the step S701), the document storage notification process is immediately terminated. Similarly, if the document data indicated by the storage information notification is not document data for which the document storage notification is to be performed in the step S702 (NO to the step S702), the document storage notification process is terminated.

Figure 8:
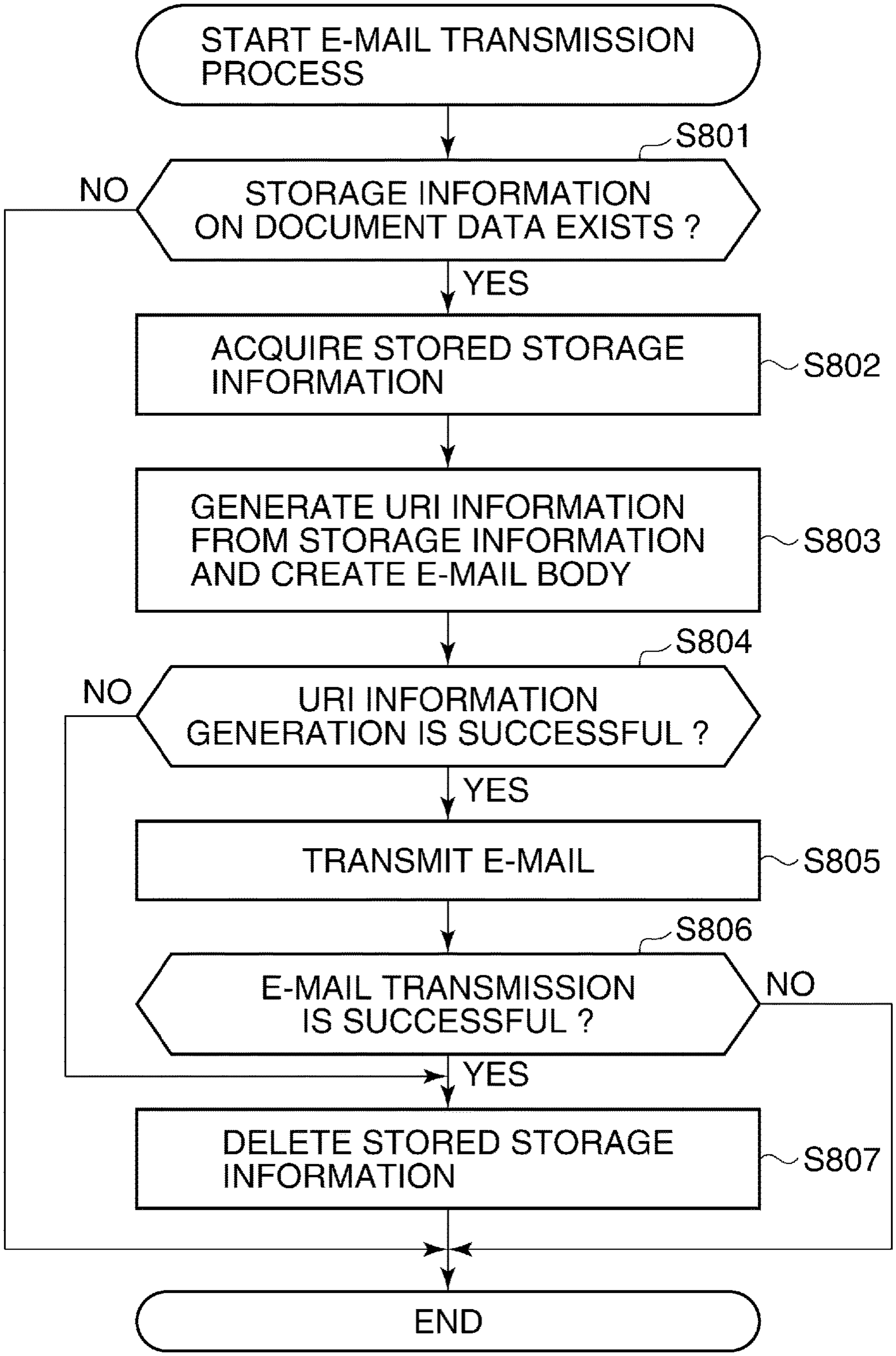
FIG. 8 is a flowchart of an e-mail transmission process executed by the document storage notification application shown in FIG. 3.

FIG. 8 is a flowchart of an e-mail transmission process executed by the document storage notification application 300 shown in FIG. 3.

Referring to FIGS. 3 and 8, first, the control section 301 queries the information management section 304 about whether or not storage information on document data exists in the HDD 205 whenever a time period set in advance elapses (step S801). A response that storage information exists is received from the information management section 304 (YES to the step S801), the control section 301 sends a request to the information management section 304 for acquiring the storage information on document data.

Upon receipt of the storage information acquisition request, the information management section 304 reads the storage information from the HDD 205, and transmits the read storage information to the control section 301 (step S802). Upon acquisition of the storage information, the control section 301 generates URI information to be provided in an e-mail body according to the storage information (step S803). Then, the control section 301 passes the URI information and the storage information to the mail transmission processing section 303. A URI information generation process will be described in detail hereinafter.

Then, the mail transmission processing section 303 determines whether or not the URI information has been generated (step S804). That is, the mail transmission processing section 303 determines whether or not the URI information has been received together with the storage information.

If generation of the URI information has been successful (YES to the step S804), the mail transmission processing section 303 creates an e-mail based on the URI information and the storage information. Then, the mail transmission processing section 303 sends the e-mail via the network interface 207 (step S805).

Next, the mail transmission processing section 303 determines whether or not the e-mail transmission processing has been successful (step S806). If it is determined that the e-mail transmission processing has been successful (YES to the step S806), the mail transmission processing section 303 sends an e-mail transmission completion notification to the control section 301. In response to the e-mail transmission completion notification, the control section 301 sends a request to the information management section 304 for deleting the corresponding storage information. Upon receipt of this request, the information management section 304 deletes the storage information indicated by the deletion request from the HDD 205 (step S807). Then, the e-mail transmission process is terminated.

On the other hand, if it is determined in the step S806 that the e-mail transmission has failed (NO to the step S806), the mail transmission processing section 303 informs the control section 301 of this fact. As a result, the e-mail transmission process is terminated without deleting the storage information managed by the information management section 304.

If generation of the URI information has failed in the step S804 (NO to the step S804), the mail transmission processing section 303 notifies the control section 301 of this fact. According to this notification, the control section 301 proceeds to the step S807, wherein the storage information is deleted as described above.

Further, if in the step S801, a response that no storage information exists is received from the information management section 304 (NO to the step S801), the e-mail transmission process is immediately terminated.

If a plurality of items of storage information exist in the step S802, a plurality of items of URI information are generated in association with these items of storage information. The plurality of items of URI information may be provided in one e-mail body. Alternatively, the items of the URI information may be provided in respective separate bodies of a plurality of e-mails, and then the e-mails may be sent.

Figure 9:
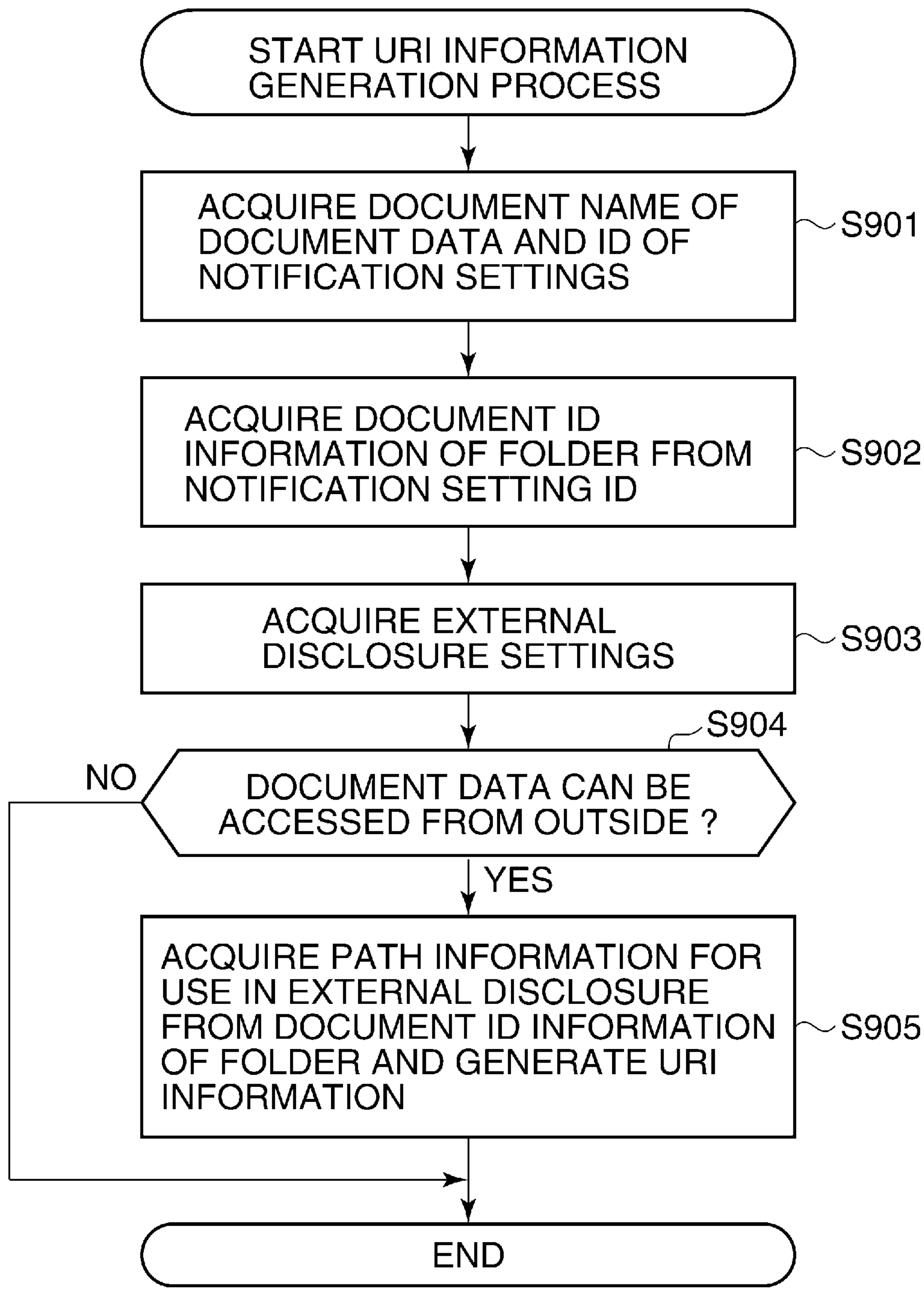
FIG. 9 is a flowchart of a URI information generation process which is referred to in FIG. 8.

FIG. 9 is a flowchart of the URI information generation process mentioned in the step S803 of the e-mail transmission process described with reference to FIG. 8.

Referring to FIGS. 3 and 9, upon acquisition of the storage information as described above, first, the control section 301 acquires the document name and the ID information (also simply referred to as the ID) from the storage information (step S901). Then, the control section 301 acquires document ID information associated with a folder for which notification settings have been made from the information management section 304 according to the ID information of the notification settings (step S902). That is, the control section 301 acquires the document ID information associated with the ID information in the notification setting information shown in FIG. 6.

Next, the control section 301 acquires information (disclosure setting conditions) indicating whether or not document data associated with the document ID information, which is managed by the document management section 320, is disclosed to the outside by the external disclosure processor 310 (step S903). Then, if the document data is disclosed to the outside, the control section 301 acquires, in addition to this information, a protocol type and information indicative of a port used for disclosing the document data (disclosure setting conditions). External disclosure settings in which these items of information are specified are referred to as the external disclosure setting information.

Note that in cases where document data is stored in the HDD 205, the control section 301 adds the external disclosure setting information to the document data when the disclosure settings are made.

Subsequently, the control section 301 determines whether or not the document data set to the storage notification can be accessed from the outside according to the external disclosure setting information (step S904). If it is determined that the document data cannot be accessed (NO to the step S904), the control section 301 terminates the URI information generation process. As a result, in the step S804 in FIG. 8, it is determined that the URI information generation has failed. Therefore, the e-mail transmission is not executed.

On the other hand, if it is determined that the document data can be accessed (YES to the step S904), the control section 301 generates a folder path for use in disclosing the document data to the outside from the document ID information associated with the folder. Then, the control section 301 generates the URI information by combining the document name with the folder path (path information) (step S905). Then, the control section 301 terminates the URI information generation process. When the URI information is thus generated, as described above, the e-mail transmission is executed by the mail transmission processing section 303.

Figure 10:
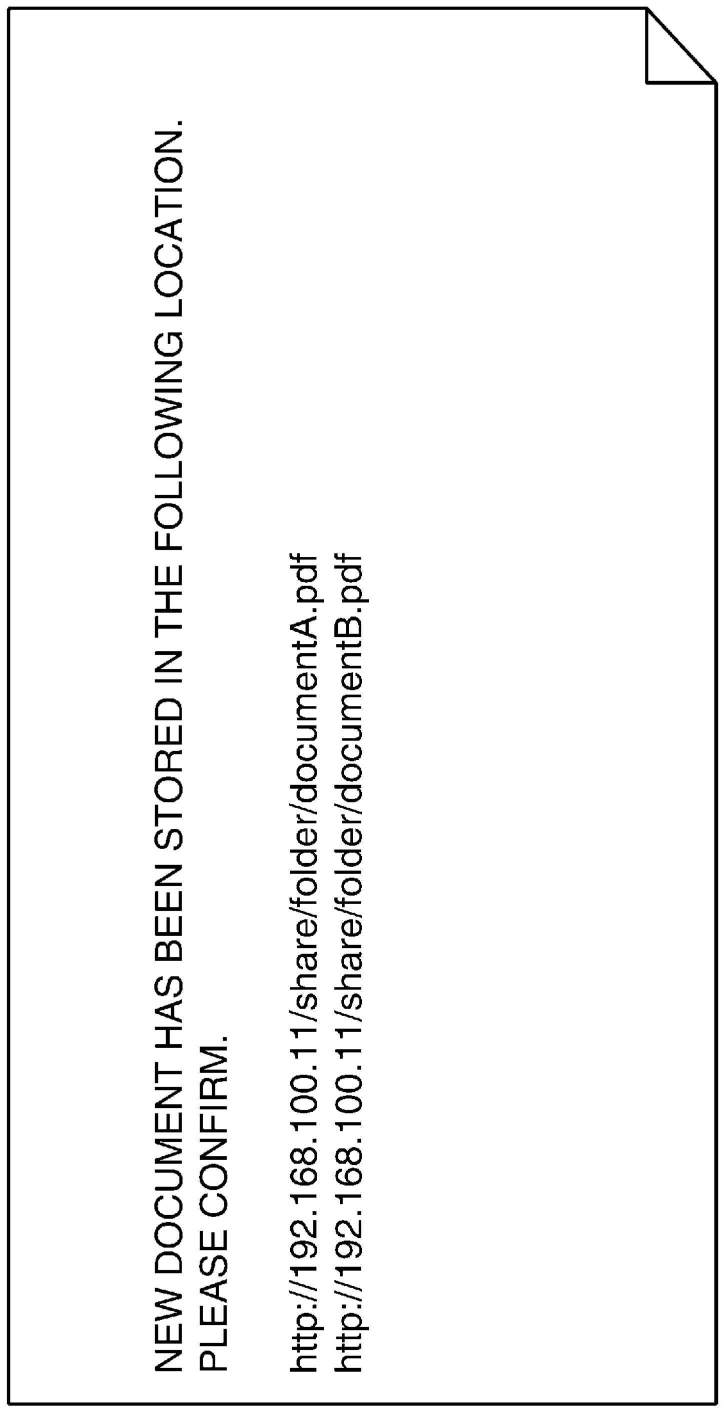
FIG. 10 illustrates an example of an e-mail transmitted by a mail transmission processing section appearing in FIG. 3.

FIG. 10 illustrates an example of an e-mail transmitted by the mail transmission processing section 303 appearing in FIG. 3.

In the example illustrated in FIG. 10, a plurality of items of URI information are generated, and the plurality of items of URI information are provided in one e-mail body. This e-mail is sent to an address of the notifying destination of the notification settings.

By the way, if the external disclosure setting information acquired in the step S903 is plural in number, the control section 301 generates, in the step S905, a folder path for use in disclosing the document data to the outside, in which is described the same protocol as that in the path information (document ID information) of the notification settings.

Now, let it be assumed that document data obtained by scanning an original in the MFP 110 is stored in a predetermined folder thereof, and then, the setting (protocol) of the WebDAV server 311 is changed to SSL after storing the document data. The following description will be given of a process executed in this case by the document storage notification application 300.

Here, the description will be given of the URI information generation process executed when the setting of the WebDAV server 311 is changed to the SSL communication after executing the document storage notification process described with reference to FIG. 7 and before executing the e-mail transmission process described with reference to FIG. 8.

Referring to FIGS. 3 and 9, the control section 301 executes the steps S901 and S902. Thereafter, in the step S903, the control section 301 acquires information indicating that the document data managed by the document management section 320 is disclosed to the outside via the WebDAV server 311 by the external disclosure processor 310 and information indicating that SSL is set, as the external disclosure setting information.

Then, if it is determined in the step S904 that the document data can be accessed from the outside, as described above, the control section 301 generates a folder path for use in disclosing the document data to the outside from the document ID information associated with the folder, in the step S905. At this time, since SSL is set as the external disclosure setting information, the control section 301 generates URI information by changing "http" of the folder path to "https".

Figure 11:
FIG. 11 illustrates an example of a body of the e-mail in which the URI information is described, which is generated when a setting of a WebDAV server is changed to SSL communication before executing the e-mail transmission process.

FIG. 11 illustrates an example of a body of an e-mail having URI information provided therein which is generated when the setting (protocol) of the WebDAV server 311 is changed to the SSL communication before executing the e-mail transmission process.

As shown in FIG. 11, "http" shown in FIG. 10 has been changed to "https".

Note that although in the first embodiment, the description has been given of the case where the setting of the WebDAV server 311 is changed to SSL, the change of the external disclosure conditions is not limited to this. The same process can be similarly applied even to a case where the disclosure using the WebDAV server 311 is switched to disclosure to the outside e.g. by the SMB server using a different protocol, and a case where the port number is changed. In any case, even when the external disclosure setting information is changed, the URI information is generated according to this change.

Further, the same process can also be applied to a case where the storage location (e.g. a folder) designated by the notification settings is changed, and a name thereof is changed. Further, the same process can also be applied to a case where the transmission destination (notifying destination) designated by the notification settings is changed.

As described above, in the first embodiment, even when information to be notified (e.g. external disclosure setting information) is changed after the notification settings are configured or the document data is stored and before transmission of the e-mail for the document storage notification is executed, it is possible to generate correct URI information and notify the notifying destination of the generated correct URI information. Therefore, users who have received document storage notification can always acquire correct URI information. Further, even when the conditions for disclosing document data to the outside are changed, it is possible to change the URI information without performing modification of the notification settings, and hence it is also possible to reduce management costs.

Further, also in a case where the document data becomes unavailable from the computer 130 in spite of notification of the URI information, such as a case where the disclosure to the outside is canceled, it is possible to stop unnecessary URI information notification processing without changing the notification settings.

Next, a description will be given of an information processing apparatus according to a second embodiment of the present invention. The second embodiment differs from the information processing apparatus according to the first embodiment only in that information on storage of document data includes document ID information. Therefore, the following description is given of the second embodiment only in points different from the first embodiment.

As described above, in the first embodiment, the document name and ID (ID information) of the notification settings are stored in the HDD 205 as the storage information as described in the step S703 in FIG. 7. In the second embodiment, the document ID information is used for storage information in place of the document name. Then, the document ID information is set as the storage information together with the ID information associated with the notification settings.

Figure 12:
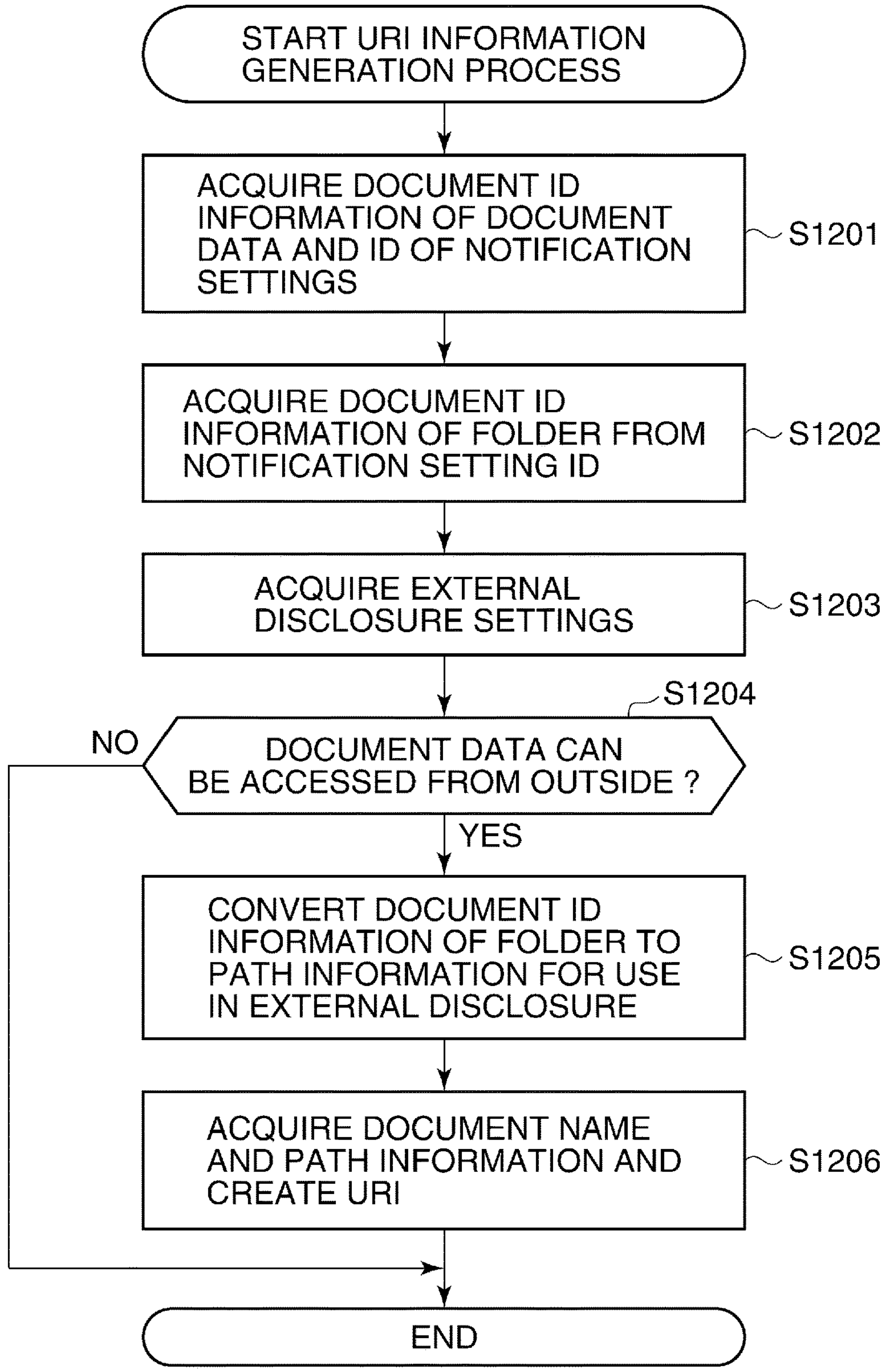
FIG. 12 is a flowchart of a URI information generation process executed by an MFP as an information processing apparatus according to a second embodiment of the present invention.

FIG. 12 is a flowchart of a URI information generation process executed by an MFP as the information processing apparatus according to the second embodiment of the present invention.

Referring to FIGS. 3 and 12, as mentioned above, in this process, the document ID information and the ID information associated with the notification settings are stored in the HDD 205 as the storage information. Upon receipt of the storage information as described hereinabove, first, the control section 301 acquires the document ID information and the ID information (also simply referred to as the ID) associated with the notification settings, from the storage information (step S1201). Then, the control section 301 acquires document ID information associated with a folder for which notification settings have been made, according to the ID information of the notification settings (step S1202).

Next, the control section 301 acquires information indicating whether or not document data associated with the document ID information, which is managed by the document management section 320, is disclosed to the outside by the external disclosure processor 310 (step S1203). Then, if the document data is disclosed to the outside, the control section 301 acquires, in addition to this information, information indicative of a protocol type and a port used for the disclosure. These items of information are referred to as the external disclosure setting information, as mentioned hereinabove.

Then, the control section 301 determines from the external disclosure setting information whether or not the document data indicated by the storage notification can be accessed from the outside (step S1204). If it is determined that the document data cannot be accessed (NO to the step S1204), the control section 301 terminates the URI information generation process. As a result, in the step S804 in FIG. 8, it is determined that the generation of the URI information has failed. Therefore, the e-mail transmission is not executed.

On the other hand, if it is determined that the document data can be accessed (YES to the step S1204), the control section 301 generates a folder path for use in disclosing the document data to the outside, according to the document ID information associated with the folder (step S1205). Then, the control section 301 acquires the document name of the document data and the folder information (path information) associated with the folder in which the document data is stored, from the information management section 304, according to the document ID information associated with the document data (step S1206). Then, the control section 301 generates URI information by combining the folder path generated in the step S1205 and the document name acquired in the step S1206. At this time, the control section 301 does not generate URI information unless the folder information (path information) associated with the document data acquired in the step S1206 matches the folder path generated in the step S1205.

Then, the control section 301 terminates the URI information generation process. When the URI information is thus generated, the e-mail transmission is executed by the mail transmission processing section 303 as described hereinabove.

As described above, in the second embodiment, when the document name is changed after the document data has been stored, the notifying destination is notified of the URI information corresponding to the changed document name by e-mail. Therefore, it is possible to always notify the notifying destination of correct URI information.

Next, a description will be given of an information processing apparatus according to a third embodiment of the present invention. In the present embodiment, differently from the information processing apparatuses according to the first and second embodiments, the user is prompted to change the notification settings, but the document storage notification to the user is inhibited. Note that the third embodiment has the same hardware configuration and performs the same notification setting registration process using the document storage notification application 300, as the first and second embodiments.

In the present embodiment, the description will be given of a case where the same notification settings as those in the first embodiment are made, and further, the setting of the WebDAV server is changed to SSL (secure socket layer) communication (also simply referred to as SSL). That is, the description will be given of a case where the protocol is changed.

Figure 13:
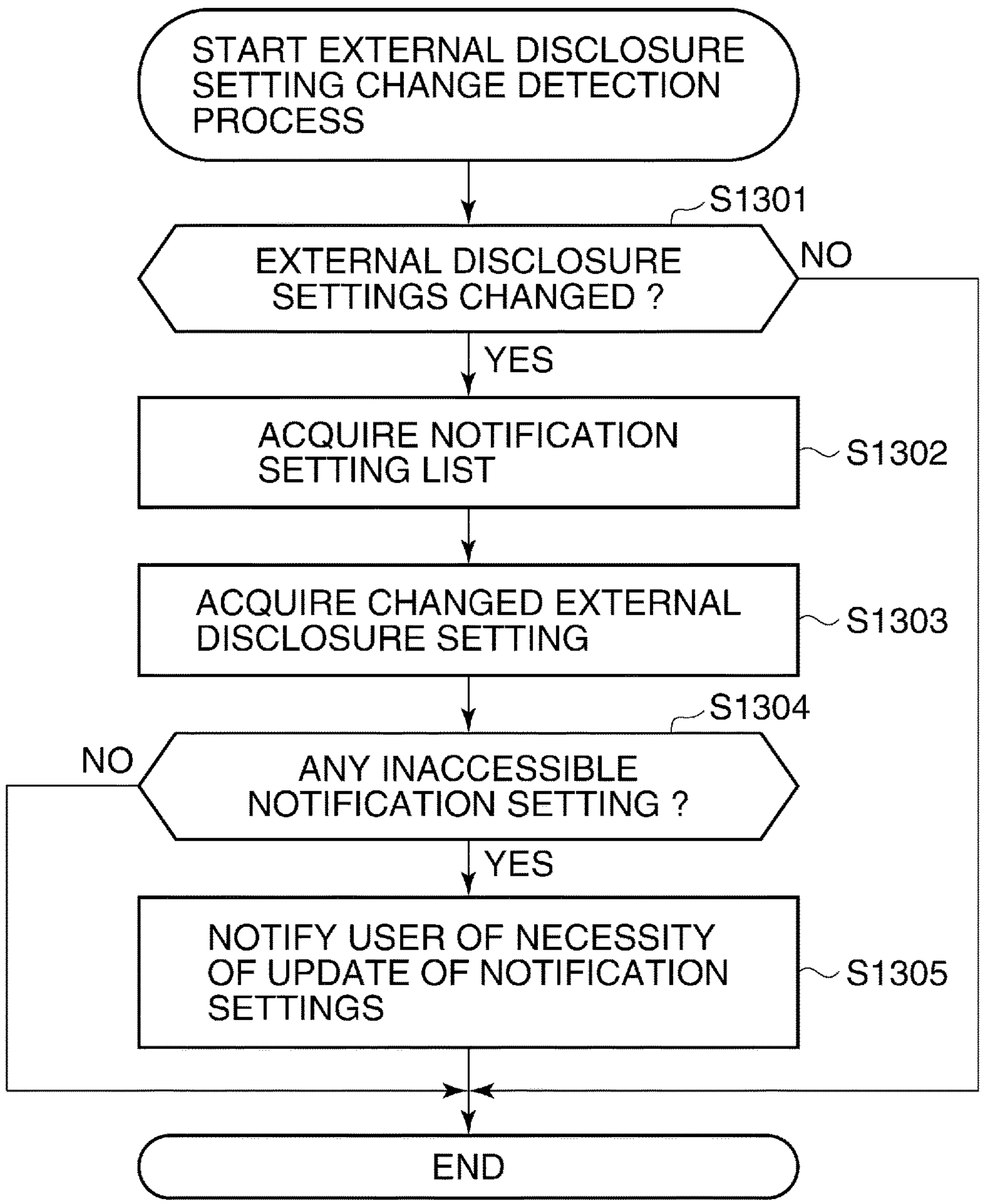
FIG. 13 is a flowchart of an external disclosure setting change detection process executed using the document storage notification application shown in FIG. 3 by an MFP as an information processing apparatus according to a third embodiment of the present invention when the setting of a WebDAV server is changed to SSL communication.

FIG. 13 is a flowchart of an external disclosure setting change detection process executed when the setting of the WebDAV server is changed to the SSL communication in the document storage notification application 300 shown in FIG. 3.

Referring to FIGS. 3 and 13, first, the control section 301 determines whether or not an external disclosure setting in the MFP 110 has been changed (step S1301). In the illustrated example, the control section 301 determines whether or not the communication setting of the WebDAV server has been changed. If it is determined that the external disclosure setting has not been changed (NO to the step S1301), the control section 301 immediately terminates the external disclosure setting change detection process.

On the other hand, if it is determined that the external disclosure setting has been changed (YES to the step S1301), the control section 301 issues a notification setting information acquisition request to the information management section 304. As a result, the control section 301 acquires all items of notification setting information (notification setting list) from the information management section 304 (step S1302).

Then, the control section 301 acquires the changed external disclosure setting, i.e. the changed communication setting of the WebDAV server (step S1303). Then, the control section 301 checks whether or not the path information in the notification setting list acquired in the step S1302 includes inaccessible path information in view of the communication setting of the WebDAV server (step S1304).

If no inaccessible notification setting is included (NO to the step S1304), the control section 301 terminates the external disclosure setting change detection process. On the other hand, if any inaccessible notification setting is included (YES to the step S1304), the control section 301 notifies the user of necessity of processing for updating the notification settings (step S1305). Then, the control section 301 terminates the external disclosure setting change detection process.

Here, when the control section 301 notifies the user of necessity of processing for updating the notification settings, the control section 301 displays a message saying that the notification settings need to be updated, e.g. on the operation panel (console section). Alternatively, the mail transmission processing section 303 may send an e-mail to the computer, indicating that the notification settings needs to be updated. In any case, the control section 301 is only required to make the user aware of the necessity of the update.

In the illustrated example, since the setting of the WebDAV server has been changed to the SSL communication, the control section 301 determines in the step S1304 that the path information of the notification setting ID "1" and the path information of the notification setting ID "2" shown in FIG. 6 both make the data inaccessible because the both of them include "http". In this case, as mentioned above, in the step S1305, the control section 301 notifies the user of necessity of processing for updating the notification settings.

The third embodiment differs from the first and second embodiments in the URI information generation process and part of the e-mail transmission process. The following description is given only of points different from the first and second embodiments.

Figure 14:
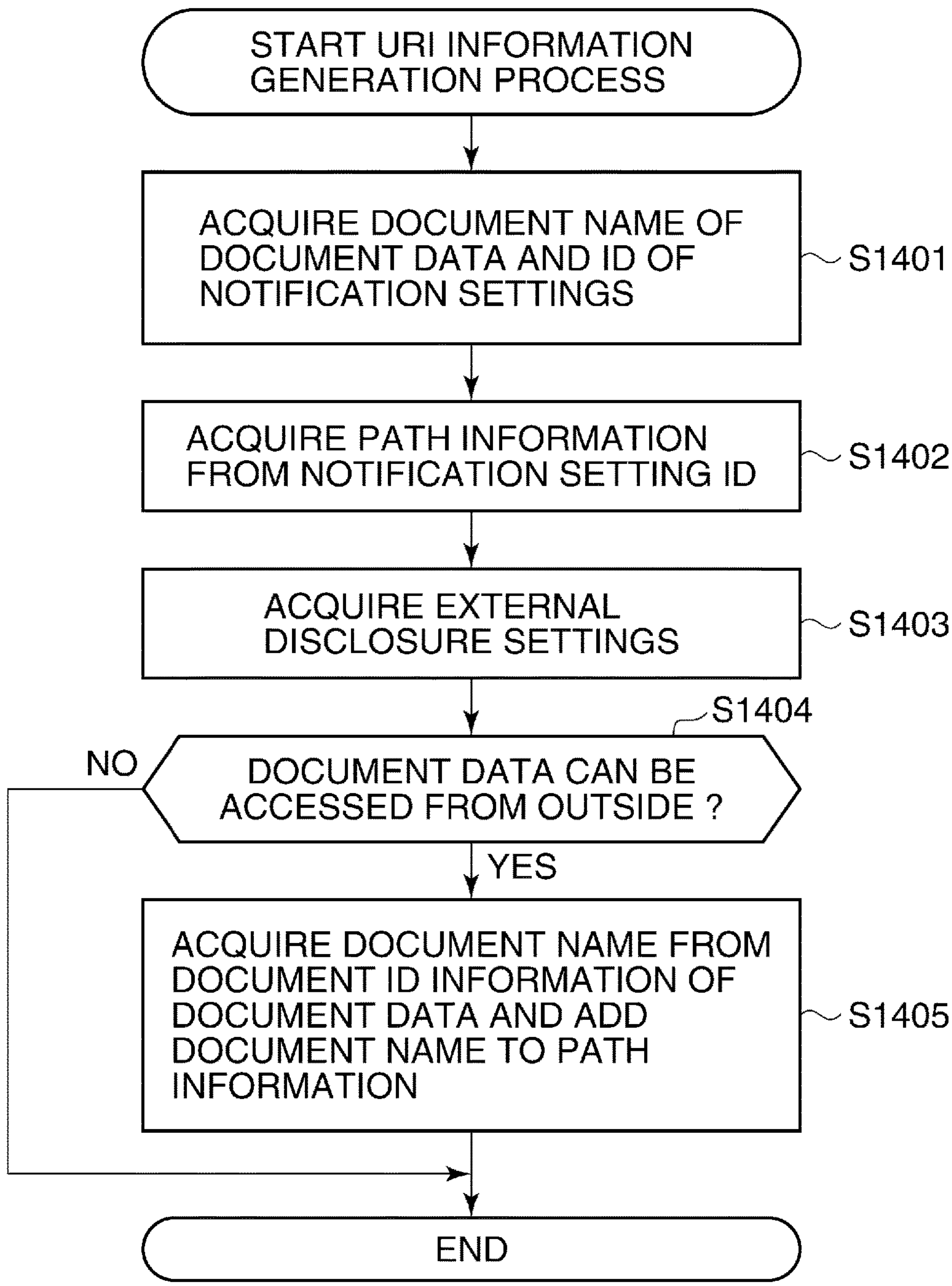
FIG. 14 is a flowchart of a URI information generation process executed by the MFP as the information processing apparatus according to the third embodiment.

FIG. 14 is a flowchart of a URI information generation process executed by the MFP 110 according to the third embodiment of the present invention.

Referring to FIGS. 3 and 14, as described above, the document ID information and the ID information associated with the notification settings are stored in the HDD 205 as the storage information. Upon receipt of storage information as described hereinabove, first, the control section 301 acquires document ID information and ID information (also simply referred to as the ID) associated with the notification settings from the storage information (step S1401). Then, the control section 301 acquires path information on a folder for which notification settings have been made according to the ID information of the notification settings (step S1402).

Next, the control section 301 acquires information indicating whether or not the document data managed by the document management section 320 is disclosed to the outside by the external disclosure processor 310 (step S1403). Then, if the document data is disclosed to the outside, the control section 301 acquires both a protocol type and information indicative of a port for use in disclosing the document data (these items of information are referred to as the external disclosure setting information as mentioned hereinabove).

Then, the control section 301 determines based on the above-mentioned path information and external disclosure setting information whether or not the document data for storage notification can be accessed from the outside (step S1404). If it is determined that the document data cannot be accessed (NO to the step S1404), the control section 301 terminates the URI information generation process.

On the other hand, if it is determined that the document data can be accessed (YES to the step S1404), the control section 301 acquires a document name from the document ID information associated with the folder, and generates URI information by adding this document name to the path information (S1405). Then, the control section 301 terminates the URI information generation process.

Note that when the setting of the WebDAV server is changed to the SSL communication, since the path information shown in FIG. 6 is "http", the control section 301 determines that the document data cannot be accessed.

Figure 15:
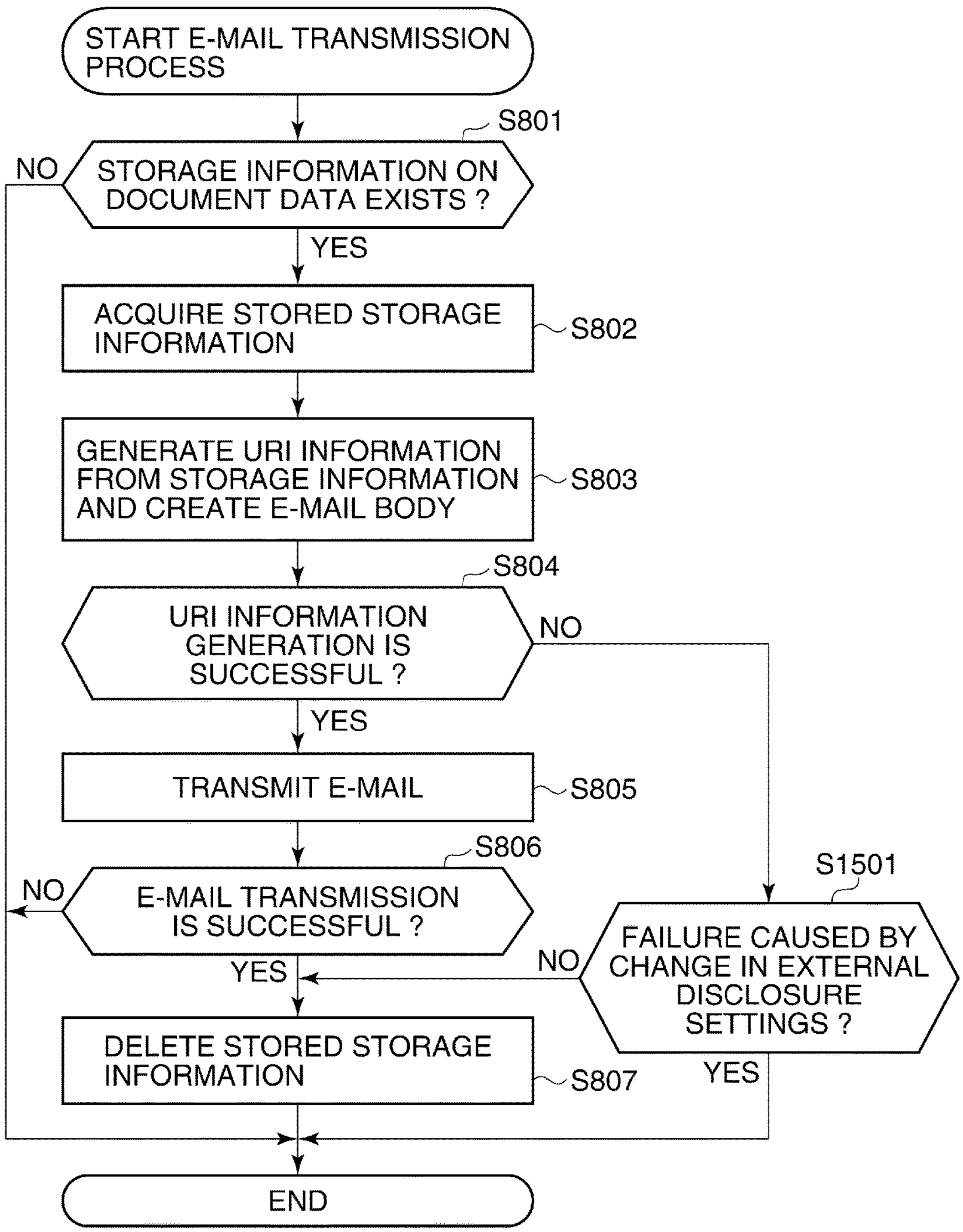
FIG. 15 is a flowchart of an e-mail transmission process executed by the MFP as the information processing apparatus according to the third embodiment.

FIG. 15 is a flowchart of an e-mail transmission process executed by the MFP 110 as the information processing apparatus according to the third embodiment of the present invention. Steps of the e-mail transmission process in FIG. 15 identical to those in FIG. 8 are omitted from description.

Referring to FIGS. 3 and 15, if it is determined in the step S804 that generation of the URI information has failed, the mail transmission processing section 303 determines whether or not the failure in the generation of the URI information is caused by inaccessibility due to a change in the external disclosure setting (step S1501). If it is determined that the failure is not caused by inaccessibility due to a change in the external disclosure setting (e.g. deletion of the folder) (NO to the step S1501), the process proceeds to the step S807, wherein the storage information is deleted.

On the other hand, if it is determined that the failure is caused by inaccessibility due to a change in the external disclosure setting (e.g. the change of the setting of the WebDAV server to SSL) (YES to the step S1501), the mail transmission processing section 303 terminates the e-mail transmission process.

As described above, according to the result of determination in the step S1501, the storage information is left undeleted when it is regarded as will enable correct e-mail notification if the notification settings are modified (corrected). This makes it possible to retry the e-mail transmission in the next e-mail transmission process.

On the other hand, if it becomes unnecessary to perform document storage notification e.g. due to deletion of the folder, the storage information is deleted, and hence it is not necessary to perform processing responsive to the storage information again in the next e-mail transmission process.

Therefore, in the third embodiment, when the external disclosure setting is changed e.g. by a change in the settings of the server and this makes it impossible to notify correct URI information, it is possible to notify the above fact and prevent the document storage notification from being performed until the notification settings are changed to the correct ones.

The present invention has been described based on the embodiments, but the present invention is by no means limited to the above-described embodiments, but it is to be understood that the present invention encompass modifications and combinations of modifications of the embodiments insofar as they do not depart from the spirit and scope thereof.

For example, by applying the functions of the above-described embodiments to a control method, this control method may be executed by the information processing apparatus. Further, a control program implementing the functions of the above-described embodiments may be executed by the information processing apparatus. Note that the control program is recorded in e.g. a non-transitory computer-readable storage medium.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-212381, filed Sep. 22, 2010, which is hereby incorporated by reference herein in its entirety.

What is claimed is:

1. An information processing apparatus communicable with an external apparatus over a network, the information processing apparatus comprising:

a storage device storing a file;

a processor configured to implement instructions stored in a memory and execute a plurality of tasks, including:

a setting task that sets one of a plurality of settings, including at least a first setting for which an SMB protocol is used for accessing the file stored in the storage device from the external apparatus and a second setting for which a WebDAV protocol is used for accessing the file stored in the storage device from the external apparatus;

a registration task that registers an e-mail address linked to a location of the file stored in the storage device; and a transmitting task that transmits to the registered e-mail address:

in a case where the setting task sets the first setting, an e-mail providing location information including, in a body part of the e-mail, an SMB path of the stored file described for accessing the stored file using the SMB protocol; and in a case where the setting task sets the second setting, an e-mail providing location information including, in the body part of the e-mail, a WebDAV path of the stored file described for accessing the stored file using the WebDAV protocol.

2. The information processing apparatus according to claim 1, wherein the SMB or WebDAV path is a URI (Uniform Resource Identifier) including a file name of the stored file and a folder name of a folder where the file is stored.

3. The information processing apparatus according to claim 1, wherein the e-mail further includes a message in the body part indicating that the stored file has been stored in the storage device.

4. The information processing apparatus according to claim 1, wherein:

the plurality of tasks include a determination task that determines within a preliminarily determined time period, whether or not a plurality of files have been stored in the storage device, in a case where the determination task determines that the plurality of files have been stored in the storage device, the location information indicates the SMB or WebDAV path of each storage location of the plurality of files.

5. The information processing apparatus according to claim 1, further comprising:

a scanner that scans an original to generate image data, wherein the storage device stores the image data generated by the scanner as the stored file.

6. The information processing apparatus according to claim 1, further comprising a printer that prints the file stored in the storage device.

7. The information processing apparatus according to claim 1, wherein the transmitting task transmits the e-mail with the location information based on the file being stored in the storage device.

8. A method of controlling an information processing apparatus having a storage device for storing a file, and communicable with an external apparatus over a network, the method comprising the steps of:

setting one of a plurality of settings, including at least a first setting for which a SMB protocol is used for accessing the file stored in the storage device from the external apparatus and a second setting for which a WebDAV protocol is used for accessing the file stored in the storage device from the external apparatus;

registering an e-mail address linked to a location of the file stored in the storage device; and transmitting to the registered e-mail address:

in a case where the setting step sets the first setting, an e-mail providing location information including, in a body part of the e-mail, a SMB path of the stored file for accessing the stored file using the SMB protocol; and in a case where the setting step sets the second setting, an e-mail providing location information including, in the body part of the e-mail, a WebDAV path of the stored file described for accessing the stored file using the WebDAV protocol.

9. The method according to claim 8, wherein:

the SMB or WebDAV path is a URI (Uniform Resource Identifier) including a file name of the stored file and a file name of a folder where the file is stored, and the e-mail includes the URI in the body part.

10. The method according to claim 9, wherein the e-mail further includes a message in the body part indicating that the stored file has been stored in the storage device.

11. The method according to claim 8, further comprising the step of:

determining within a preliminarily determined time period, whether or not a plurality of files have been stored in the storage device, wherein in a case where the determining step determines that the plurality of files have been stored in the storage device, the location information indicates the SMB or WebDAV path of each storage location of the plurality of files.

12. The method according to claim 8, wherein the information processing apparatus further comprises:

a scanner that scans an original to generate image data, wherein the storage device stores the image data generated by the scanner as the stored file.

13. The method according to claim 8, wherein the information processing apparatus further comprises a printer that prints the file stored in the storage device.

14. The method according to claim 8, further comprising the step of:

registering an address of the external apparatus linked to a folder, wherein the location information includes the address linked to the folder where the file has been stored.

15. The method according to claim 8, wherein the transmitting step transmits the e-mail with the location information based on the file being stored in the storage device.

16. A non-transitory computer-readable storage medium storing a computer-executable program executable by an information processing apparatus having a storage device for storing a file, and communicable with an external apparatus over a network, to execute a control method comprising the steps of:

setting one of a plurality of settings, including at least a first setting for which a SMB protocol is used for accessing the file stored in the storage device from the external apparatus and a second setting for which a WebDAV protocol is used for accessing the file stored in the storage device from the external apparatus;

registering an e-mail address linked to a location of the file stored in the storage device; and transmitting to the registered e-mail address:

in a case where the setting step sets the first setting, an e-mail providing location information including, in a body part of the e-mail, a SMB path of the stored file for accessing the stored file using the SMB protocol; and in a case where the setting step sets the second setting, an e-mail providing location information including, in the body part of the e-mail, a WebDAV path of the stored file described for accessing the stored file using the WebDAV protocol.

* * * * *